(12) United States Patent
Wang

(10) Patent No.: US 12,030,993 B2
(45) Date of Patent: Jul. 9, 2024

(54) POLYIMIDE AND METHOD FOR MANUFACTURING SAME

(71) Applicant: Wuhan China Star Optoelectronics Semiconductor Display Technology Co., Ltd., Hubei (CN)

(72) Inventor: Yamin Wang, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 1014 days.

(21) Appl. No.: 16/966,002

(22) PCT Filed: Mar. 29, 2020

(86) PCT No.: PCT/CN2020/087735
§ 371 (c)(1),
(2) Date: Jul. 30, 2020

(87) PCT Pub. No.: WO2021/159616
PCT Pub. Date: Aug. 19, 2021

(65) Prior Publication Data
US 2023/0174717 A1    Jun. 8, 2023

(30) Foreign Application Priority Data

Feb. 12, 2020   (CN) .......................... 202010089647.1

(51) Int. Cl.
*C08G 73/10*      (2006.01)

(52) U.S. Cl.
CPC ....... *C08G 73/1003* (2013.01); *C08J 2379/08* (2013.01)

(58) Field of Classification Search
CPC ... C08G 73/10; C08G 73/1078; C08J 2379/08
See application file for complete search history.

(56) References Cited

U.S. PATENT DOCUMENTS

2018/0305514 A1   10/2018   Sakaguchi et al.

FOREIGN PATENT DOCUMENTS

| CN | 101589333 | 11/2009 |
|---|---|---|
| CN | 101591521 | 12/2009 |
| CN | 101709515 | 5/2010 |
| CN | 103255491 | 8/2013 |
| CN | 104191799 | * 12/2014 |
| CN | 108219133 | 6/2018 |
| CN | 110698682 | 1/2020 |
| JP | 3989650 | 10/2007 |
| JP | 2015-218179 | 12/2015 |

OTHER PUBLICATIONS

Li et al (CN 104191799), English translation, published on Dec. 2014.*
Hsiao et al (Preparation of Polyamide-Imides via the Phosphorylation Reaction. 11. Synthesis of Wholly Aromatic Polyamide-imides from N-[ p-( or rn-) Carboxyphenyl]trimellitimides and Various Aromatic Diamines , Journal of Polymer Science: Part A: Polymer Chemistry, vol. 28, 1149-1159 (1990), published on Apr. 1990.*
Ishige et al. "Precise Analysis of Thermal Volume Expansion of Crystal Lattice for Fully Aromatic Crystalline Polyimides by X-Ray Diffraction Method: Relationship Between Molecular Structure and Linear/Volumetric Thermal Expansion", Macromolecules, 50(5): 2112-2123, Published Online Feb. 24, 2017.

* cited by examiner

*Primary Examiner* — Gregory Listvoyb

(57) ABSTRACT

A polyimide and a method for manufacturing the polyimide are provided. The method for manufacturing the polyimide includes: mixing a diamine compound with a substance and an organic solvent, wherein the diamine compound includes an amide bond, and a molecular structure of the substance includes an ether dianhydride; and forming the polyimide by a cross-linking and curing process. A regular molecular chain arrangement, wherein the regular molecular chain arrangement has highly oriented in-plane crystallization and low free volume; a simple rigid planar structure; and intra-molecular hydrogen bonds are introduced to prepare the polyimide that has high barrier performance, excellent heat resistance, and a low thermal expansion coefficient.

19 Claims, 3 Drawing Sheets

POLYIMIDE AND METHOD FOR MANUFACTURING SAME

RELATED APPLICATIONS

This application is a National Phase of PCT Patent Application No. PCT/CN2020/087735 having International filing date of Apr. 29, 2020, which claims the benefit of priority of Chinese Patent Application No. 202010089647.1 filed on Feb. 12, 2020. The contents of the above applications are all incorporated by reference as if fully set forth herein in their entirety.

FIELD AND BACKGROUND OF THE INVENTION

The present disclosure relates to the field of display technologies, and particularly relates to a polyimide and a method for manufacturing the polyimide.

With improvement of living standards, flexible organic light emitting diode (OLED) display devices are increasingly sought after.

A substrate of the flexible OLED display device is generally composed of polyimide materials, but it is difficult for polyimide materials in prior art to combine heat resistance, dimensional stability, and gas barrier properties.

Therefore, a polyimide and a method for manufacturing the polyimide are urgently needed to solve the above technical problem.

The present disclosure provides a polyimide and a method for manufacturing the polyimide to solve a technical problem that it is difficult for polyimide materials in the prior art to combine heat resistance, dimensional stability, and gas barrier properties.

SUMMARY OF THE INVENTION

To solve the above technical problem, a technical solution provided by the present disclosure is as follows:

A method for manufacturing a polyimide includes:
defining a first substance by using a diamine compound including an amide bond;
mixing a second substance with a first organic solvent and the first substance to prepare a third substance, wherein a molecular structure of the second substance includes an ether dianhydride; and
processing the third substance by a cross-linking and curing process to form the polyimide.

In the method of the prevent disclosure, a plurality of steps for manufacturing the first substance include:
mixing a p-phenylenediamine or a 9H-carbazole-2,7-diamine with a second organic solvent to prepare a first mixture;
mixing a 4-aminobenzoic acid with the first mixture to prepare a second mixture, wherein a molar ratio of the p-phenylenediamine or the 9H-carbazole-2,7-diamine to the 4-aminobenzoic acid is 1:1; and
processing the second mixture by vacuum distillation and vacuum drying to prepare the first substance.

In the method of the prevent disclosure, the second organic solvent includes N, N-dimethylformamide, N-methyl pyrrolidone, and N, N-dimethylacetamide.

In the method of the prevent disclosure, a mass of the second organic solvent is 1 time to 5 times a total mass of the p-phenylenediamine and the 4-aminobenzoic acid, or the mass of the first organic solvent the second organic solvent is 1 time to 5 times a total mass of 9H-carbazole-2,7-diamine and 4-aminobenzoic acid.

In the method of the prevent disclosure, the 4-aminobenzoic acid with the molar ratio of 1:1 to the p-phenylenediamine or the 9H-carbazole-2,7-diamine is added to the first mixture within a preset duration, and the preset duration ranges from 1 hour to 2 hours.

In the method of the prevent disclosure, a preparation of the second mixture is processed by stirring with a stirring rate ranging from 100 rpm to 250 rpm, and a reaction time of the preparation ranges from 2 hours to 7 hours.

In the method of the prevent disclosure, a plurality of steps for manufacturing the third substance include:
mixing the second substance with the first organic solvent to prepare a third mixture, wherein the molecular structure of the second substance includes the ether dianhydride;
mixing other second substance with the third mixture to prepare a fourth mixture, wherein a molecular structure of the other second substance includes an ether dianhydride, and a molar ratio of the other second substance and the first substance is 1:1; and
performing a bubble removing process for the fourth mixture to prepare the third substance.

In the method of the prevent disclosure, a preparation of the third mixture is processed by stirring with a stirring rate ranging from 100 rpm to 250 rpm.

In the method of the prevent disclosure, a plurality of steps of the bubble removing process include:
stopping stirring the fourth mixture and filtering the fourth mixture in vacuum to prepare a fifth mixture; and
pumping the fifth mixture with a vacuum pump and allowing the fifth mixture to stand to form the third substance.

In the method of the prevent disclosure, the fifth mixture is pumped with the vacuum pump for 0.8 hour to 1.2 hours and the fifth mixture is allowed to stand for 2 hours to 4 hours to prepare the third substance.

In the method of the prevent disclosure, during a preparation of the fourth mixture, a stirring rate ranges from 300 rpm to 500 rpm, a reaction time ranges from 5 hours to 12 hours, and a reaction temperature ranges from 50° C. to 100° C.

In the method of the prevent disclosure, the first organic solvent includes N, N-dimethylformamide, N-methyl pyrrolidone, and N, N-dimethylacetamide.

In the method of the prevent disclosure, a mass of the first organic solvent is 1 time to 5 times a mass of the second substance.

In the method of the prevent disclosure, the cross-linking and curing process includes:
removing a solvent of the third substance by a spin coating and a high-temperature vacuum drying process, wherein the solvent has a first volume, and the first volume accounts for 65% to 75% of a volume of the third substance.

In the method of the prevent disclosure, the solvent having been removed is the first organic solvent.

In the method of the prevent disclosure, after the third substance is processed by the spin coating and the high-temperature vacuum drying process to prepare a sixth mixture, the cross-linking and curing process further includes:
maintaining the sixth mixture at a first temperature for 20 minutes to 40 minutes;

heating the sixth mixture from the first temperature to a second temperature and holding the second temperature for 50 minutes to 70 minutes; and cooling the sixth mixture from the second temperature to the first temperature;

wherein the first temperature ranges from 110° C. to 130° C., the second temperature ranges from 420° C. to 500° C., a duration time of a preset post-drying process ranges from 3 hours to 5 hours.

In the method of the prevent disclosure, the sixth mixture is heated from the first temperature to the second temperature in a constant heating rate, and the constant heating rate ranges from 4° C./min to 10° C./min; and the sixth mixture is cooled from the second temperature to the first temperature in a constant cooling rate, and the constant cooling rate ranges from 4° C./min to 10° C./min.

In the method of the prevent disclosure, the first substance includes:

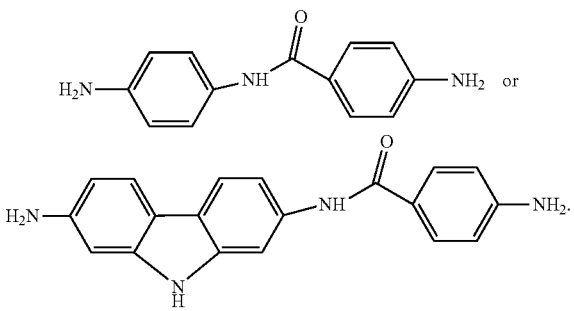

In the method of the prevent disclosure, the second substance includes:

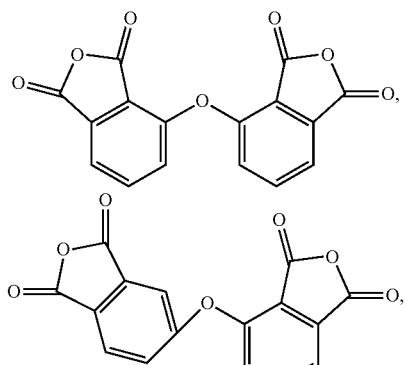

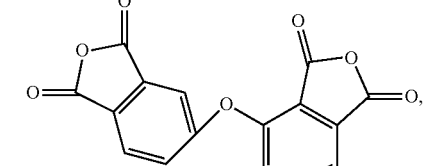

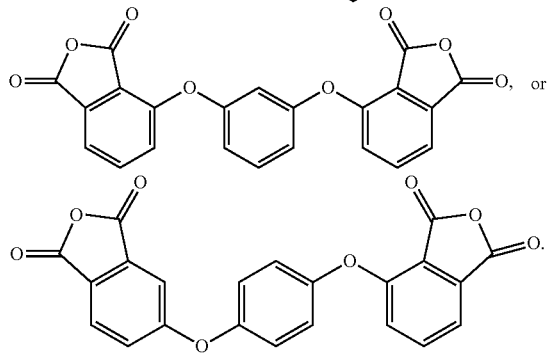

The present disclosure further provides a polyimide, structures of the polyimide include:

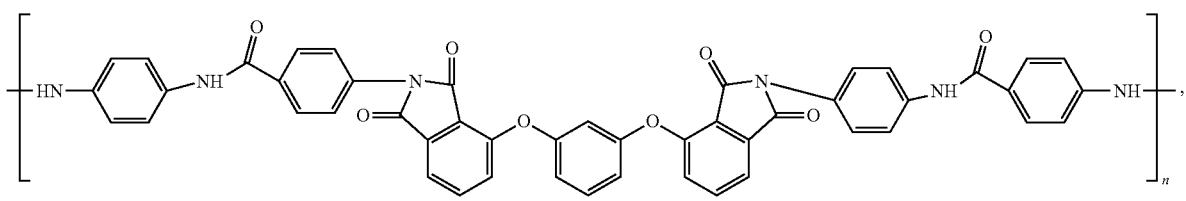

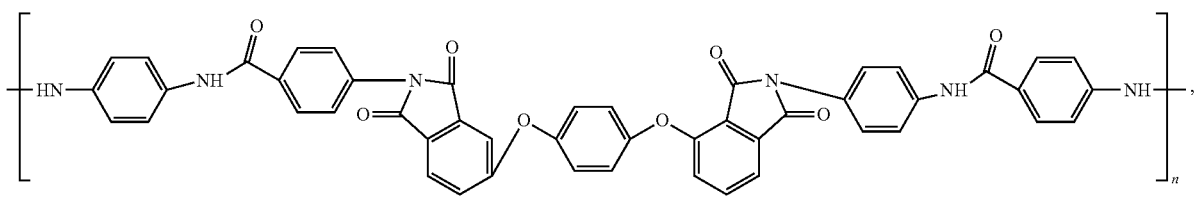

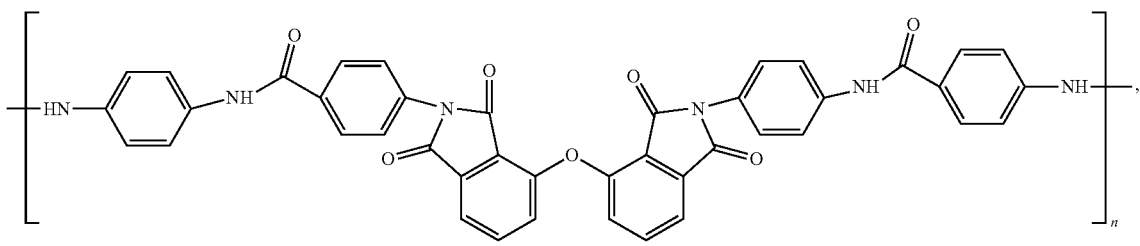

-continued

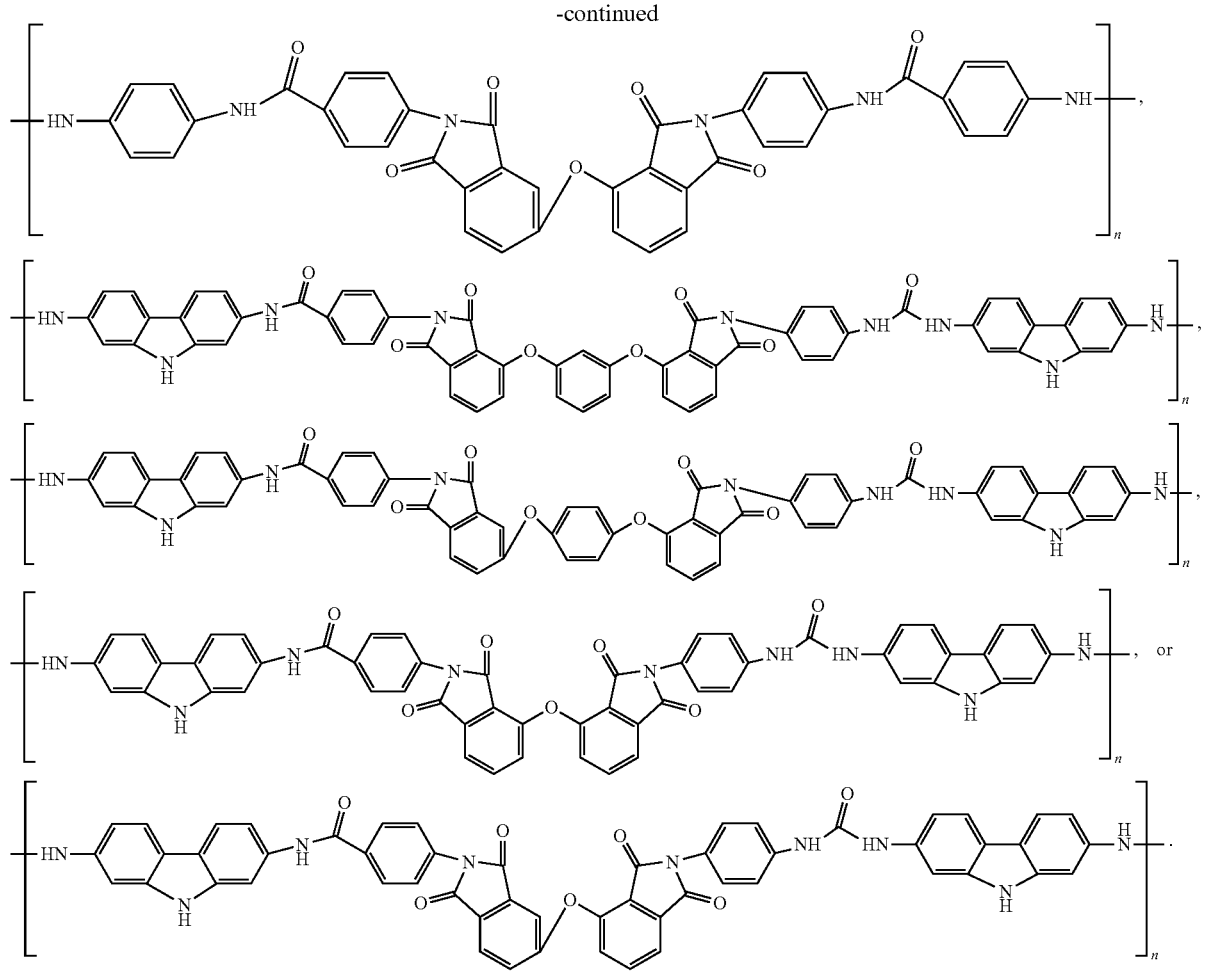

Beneficial Effects

The present disclosure introduces a regular molecular chain arrangement, wherein the regular molecular chain arrangement has highly oriented in-plane crystallization and low free volume; a simple rigid planar structure; and intramolecular hydrogen bonds to prepare a polyimide having high barrier performance, excellent heat resistance, and low thermal expansion coefficient.

DESCRIPTION OF SPECIFIC EMBODIMENTS OF THE INVENTION

The present disclosure provides a polyimide and a method for manufacturing the polyimide. In order to clarify a purpose, technical solutions, and effects of the present disclosure, the present disclosure is described in further detail below with reference to drawings and embodiments. It can be understood that the embodiments described herein are used merely for explaining the present disclosure and are not intended to limit the present disclosure.

Figure 1:
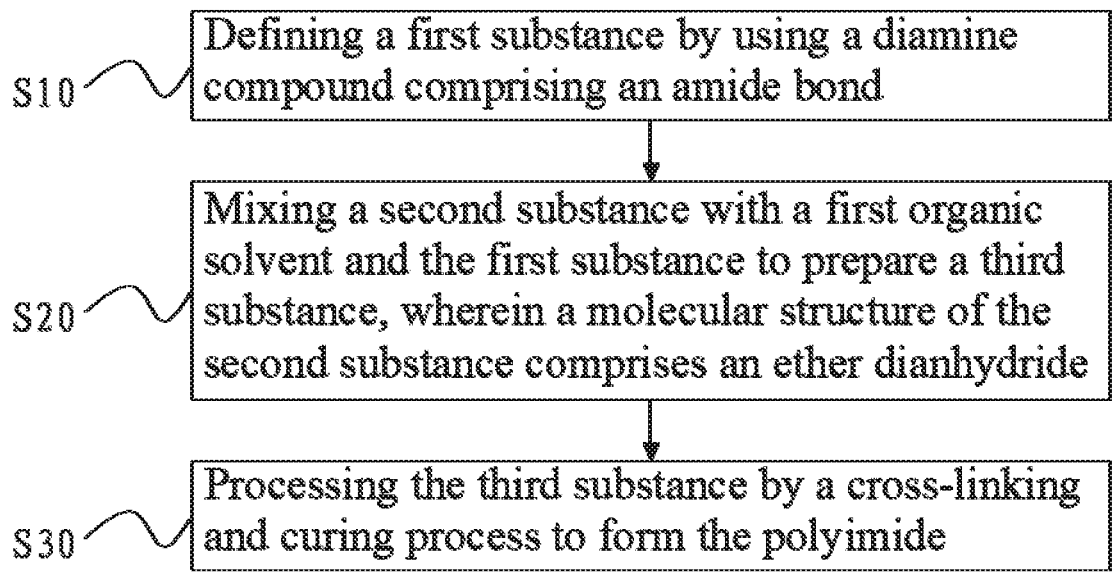
FIG. 1 is a flowchart of a method for manufacturing a polyimide of the present disclosure.
Figure 2:
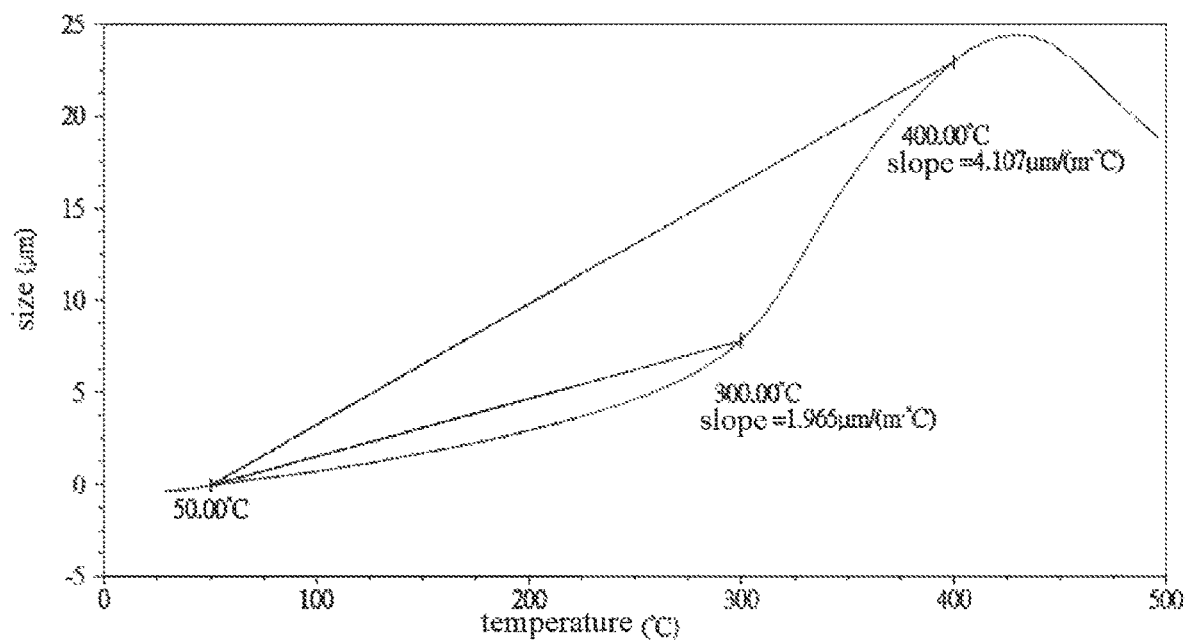
FIG. 2 is a thermal expansion curve diagram of a polyimide prepared by the method for manufacturing the polyimide of the present disclosure.
Figure 3:
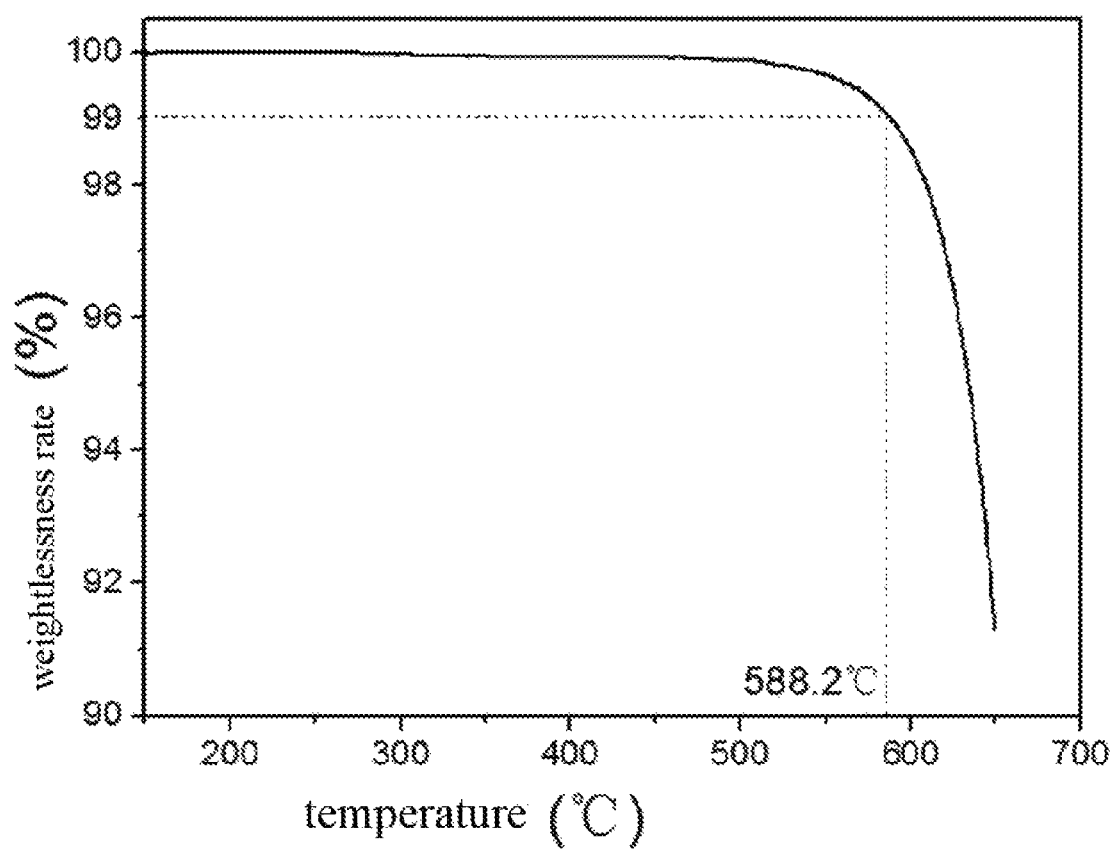
FIG. 3 is a thermal weight loss curve diagram of a polyimide prepared by the method for manufacturing the polyimide of the present disclosure.

Referring to FIG. 1 to FIG. 3, the present disclosure provides a method for manufacturing a polyimide, the method includes:
S10, defining a first substance by using a diamine compound including an amide bond;
S20, mixing a second substance with a first organic solvent and the first substance to prepare a third substance, wherein a molecular structure of the second substance includes an ether dianhydride; and
S30, processing the third substance by a cross-linking and curing process to form the polyimide.

The present disclosure introduces a regular molecular chain arrangement, wherein the regular molecular chain arrangement has highly oriented in-plane crystallization and low free volume; a simple rigid planar structure; and intramolecular hydrogen bonds to prepare the polyimide which has high barrier performance, excellent heat resistance, and low thermal expansion coefficient.

Technical solutions of the present disclosure are described with specific embodiments.

Referring to FIG. 1 to FIG. 3, the method for manufacturing the polyimide includes:

S10, defining a first substance by using a diamine compound including an amide bond.

In an embodiment, the step S10 for manufacturing the first substance includes:

S11, mixing a p-phenylenediamine or a 9H-carbazole-2,7-diamine with a second organic solvent to prepare a first mixture.

In the embodiment, the second organic solvent includes N, N-dimethylformamide, N-methyl pyrrolidone, and N, N-dimethylacetamide.

In the embodiment, a mass of the second organic solvent is 1 to 5 times a total mass of the p-phenylenediamine and the 4-aminobenzoic acid, or the mass of the second organic solvent is 1 to 5 times a total mass of the 9H-carbazole-2,7-diamine and the 4-aminobenzoic acid;

S12, mixing the 4-aminobenzoic acid with the first mixture to prepare a second mixture, wherein a molar ratio of the p-phenylenediamine or the 9H-carbazole-2,7-diamine to the 4-aminobenzoic acid is 1:1.

In the embodiment, in the step S12, the 4-aminobenzoic acid with the molar ratio of 1:1 to the p-phenylenediamine or the 9H-carbazole-2,7-diamine is added to the first mixture to prepare the second mixture within a preset duration, and the preset duration ranges from 1 hour to 2 hours, a first stirring rate ranges from 100 rpm to 250 rpm, and a reaction time of the preparation ranges from 2 hours to 7 hours.

S13, processing the second mixture by vacuum distillation and vacuum drying to prepare the first substance.

In the embodiment, in the step S13, the second mixture is processed by vacuum distillation and vacuum drying for 24 hours to prepare the first substance.

In the embodiment, the first substance includes:

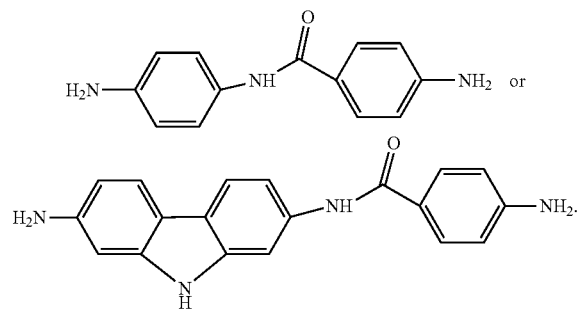

S20, mixing a second substance with a first organic solvent and the first substance to prepare a third substance, wherein a molecular structure of the second substance includes an ether dianhydride.

In the embodiment, the second substance includes:

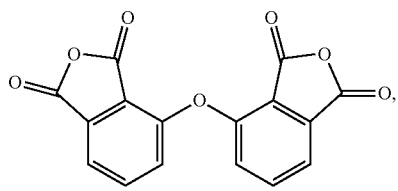

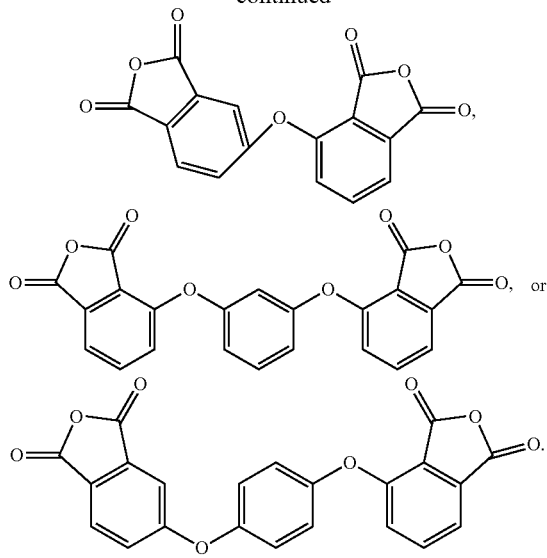

In the embodiment, the step S20 for manufacturing the third substance includes:

S21, mixing the second substance with the first organic solvent to prepare a third mixture, wherein the molecular structure of the second substance includes the ether dianhydride.

In the embodiment, in the step S21, mixing the second substance with the first organic solvent slowly to ensure that a reaction is adequate, wherein a preparation of the third mixture is processed by stirring with a stirring rate ranging from 100 rpm to 250 rpm.

In the embodiment, the first organic solvent includes N, N-dimethylformamide, N-methyl pyrrolidone, and N, N-dimethylacetamide.

In the embodiment, a mass of the first organic solvent is 1 to 5 times a mass of the second substance.

S22, mixing other second substance with the third mixture to prepare a fourth mixture, wherein a molecular structure of the other second substance includes an ether dianhydride, and a molar ratio of the other second substance and the first substance is 1:1.

In the embodiment, in the step of S22, the other second substance is added to the third mixture, wherein the molecular structure of the other second substance includes the ether dianhydride, and during a preparation of the fourth mixture, a stirring rate ranges from 300 rpm to 500 rpm, a reaction time ranges from 5 hours to 12 hours, and a reaction temperature ranges from 50° C. to 100° C.

S23, performing a bubble removing process for the fourth mixture to prepare the third substance.

In the embodiment, the step S23 includes:

S231, stopping stirring the fourth mixture and filtering the fourth mixture in vacuum to prepare a fifth mixture.

S232, pumping the fifth mixture with a vacuum pump and allowing the fifth mixture to stand to form the third substance.

In the embodiment, in the step S232, the fifth mixture is pumped with the vacuum pump for 0.8 hour to 1.2 hours and the fifth mixture is allowed to stand for 2 hours to 4 hours to prepare the third substance.

In the embodiment, in the step S232, the fifth mixture is pumped with the vacuum pump for 1 hour and the fifth mixture is allowed to stand for 2 hours to 4 hours to prepare the third substance. After vacuum filtration and vacuum pumping, bubbles in the third substance have been removed, which can ensure normal progress of subsequent steps and prevent the bubbles from affecting product quality.

S30, processing the third substance by a cross-linking and curing process to form the polyimide.

In the embodiment, structures of the polyimide prepared by the step S10, the step S20 and the step S30 include:

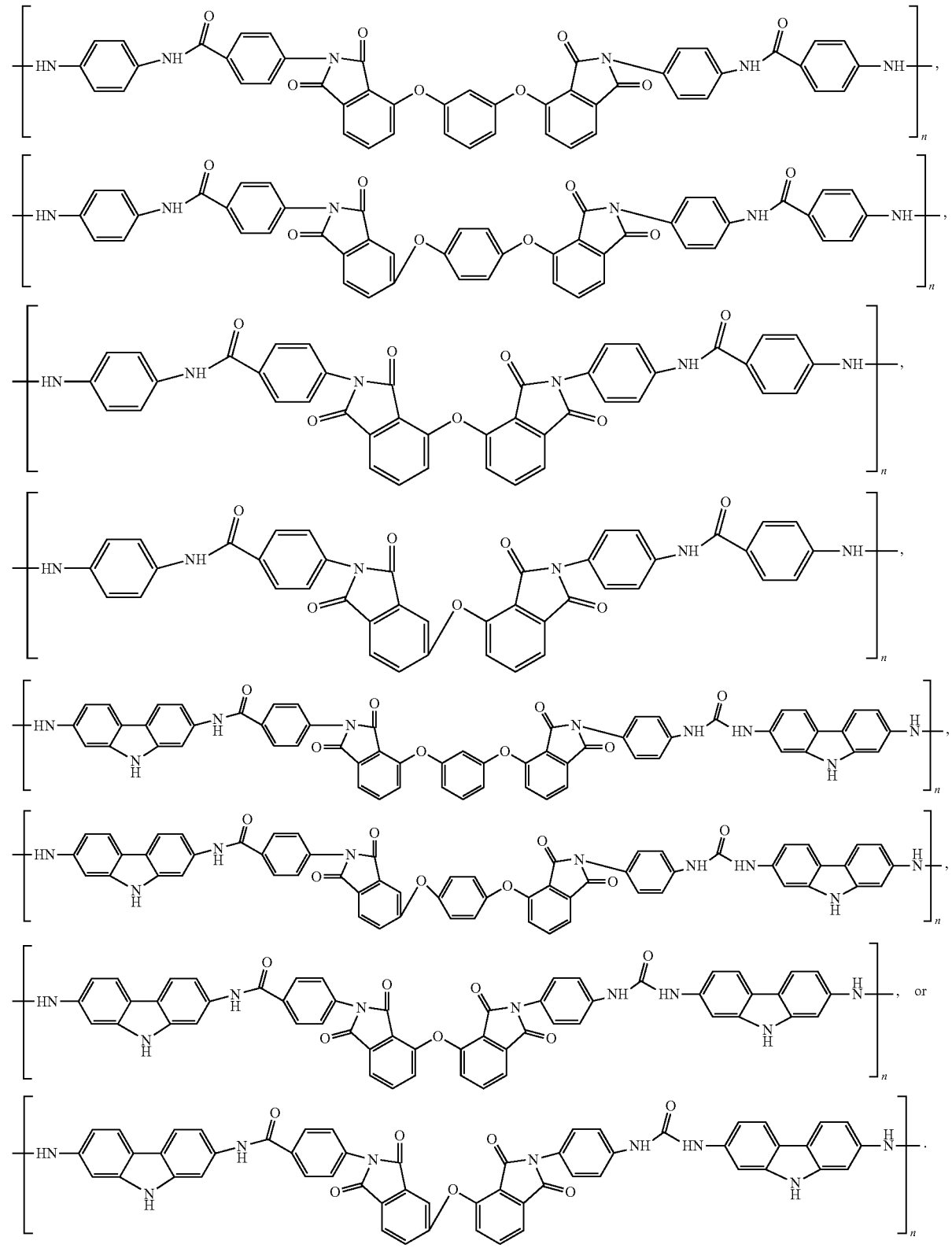

In the embodiment, a main reaction equation of the method for manufacturing the polyimide is as follows:

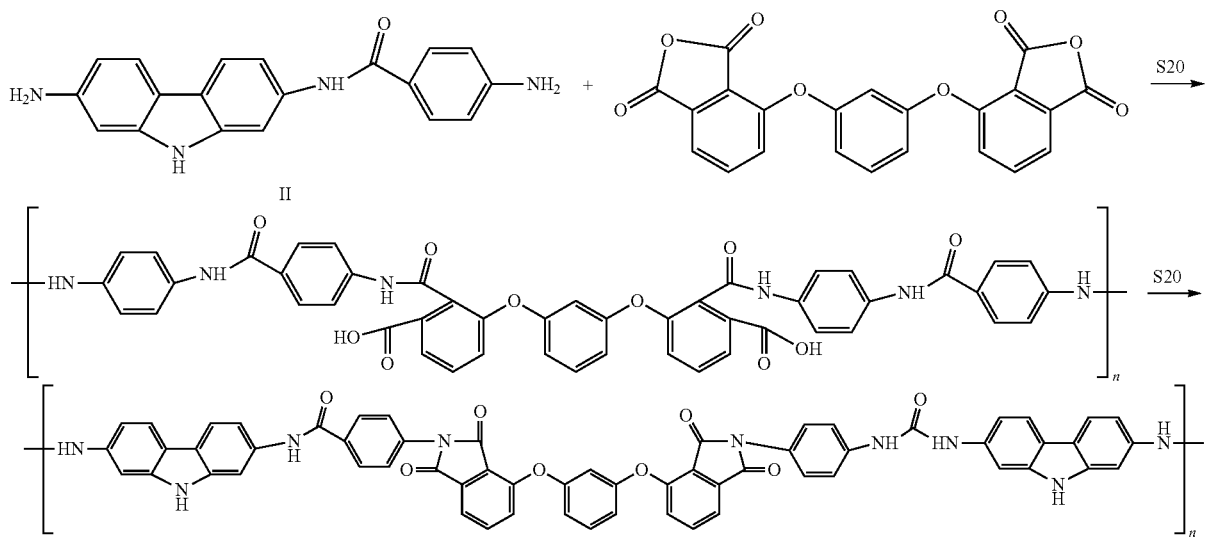

The above reaction equation is an embodiment, in which a reactant in step S20 can be replaced with any one of the corresponding first substance and/or the corresponding second substance in the embodiments of the present disclosure, which will not be repeated here.

In the embodiment, the cross-linking and curing process includes a spin coating, a high-temperature vacuum drying, and a preset post-drying process.

In the embodiment, a step of the high-temperature vacuum drying process includes removing a solvent of the third substance by the spin coating and the high-temperature vacuum drying process, wherein the solvent has a first volume, and the first volume accounts for 65% to 75% of a volume of the third substance.

In the embodiment, the first volume accounts for 70% of the volume of the third substance.

In the embodiment, the solvent having been removed by the spin coating and the high-temperature vacuum drying process is the first organic solvent.

In the embodiment, the solvent having been removed by the spin coating and the high-temperature vacuum drying process is the first organic solvent, and the first organic solvent is N, N-dimethylformamide. At this time, when a temperature is increased, it is easier to remove the solvent.

In the embodiment, the spin coating process is performed by a slit coater.

In an embodiment, the preset post-drying process includes:
S331, maintaining a sixth mixture at a first temperature for 20 minutes to 40 minutes, wherein the sixth mixture is prepared by the third substance through the spin coating and the high temperature vacuum drying process.

In the embodiment, the sixth mixture is maintained at the first temperature for 30 minutes.

S332, heating the sixth mixture from the first temperature to a second temperature and holding the second temperature for 50 minutes to 70 minutes.

In the embodiment, the second temperature is maintained for 60 minutes.

In the embodiment, the sixth mixture is heated from the first temperature to the second temperature in a constant heating rate, and the constant heating rate ranges from 4° C./min to 10° C./min. The constant heating rate makes the solvent volatilization rate stable, which is conducive to the cross-linking and curing process.

In the embodiment, the sixth mixture is heated from the first temperature to the second temperature in a constant heating rate, and the constant heating rate is 4° C./min. A slower constant heating rate makes the solvent volatilization rate stable, and effects of the cross-linking and curing process is better.

S333, cooling the sixth mixture from the second temperature to the first temperature.

In the embodiment, the sixth mixture is cooled from the second temperature to the first temperature in a constant cooling rate, and the constant cooling rate ranges from 4° C./min to 10° C./min. The constant cooling rate makes the solvent volatilization rate stable, which is conducive to the cross-linking and curing process.

In the embodiment, the sixth mixture is cooled from the second temperature to the first temperature in a constant cooling rate, and the constant cooling rate is 7° C./min. A moderate constant cooling rate makes the cross-linking and curing process better.

In the embodiment, the first temperature ranges from 110° C. to 130° C., the second temperature ranges from 420° C. to 500° C., and a duration time of the preset post-drying process ranges from 3 hours to 5 hours.

In one embodiment, the first temperature is 120° C., and the second temperature is 450° C.

In one embodiment, the first temperature is 120° C., the second temperature is 475° C.

In an embodiment, the preset post-drying process includes:
S331, maintaining the sixth mixture at the first temperature for 15 minutes to 35 minutes, wherein the sixth mixture is prepared by the third substance through the spin coating and the high temperature vacuum drying process.

S332, heating the sixth mixture from the first temperature to a platform temperature and holding the platform temperature for 15 to 25 minutes.

In the embodiment, the platform temperature is between the first temperature and the second temperature, and a number of the platform temperatures is greater than or equal to 1.

In the embodiment, when the number of the platform temperatures is greater than 1, heating the sixth mixture from the first temperature to a first platform temperature, holding the first platform temperature for 15 to 25 minutes, heating the sixth mixture from the first platform temperature to the second temperature, and holding the second temperature for 15 to 25 minutes, and so on, until the sixth mixture is heated up to the second temperature.

S333, heating the sixth mixture from the platform temperature to the second temperature and holding the second temperature for 20 to 45 minutes.

S334, cooling the sixth mixture from the second temperature to the first temperature.

In the embodiment, the first temperature ranges from 110° C. to 130° C., the second temperature ranges from 420° C. to 500° C., and a duration time of a preset post-drying process ranges from 3 hours to 5 hours.

In one embodiment, the first temperature is 120° C., and the second temperature is 450° C.

In one embodiment, the first temperature is 120° C., and the second temperature is 470° C.

Materials can achieve cross-linking and solvent removal at different constant temperatures by using different heating rates and multiple heating platforms. Because of an introduction of the diamine including amide, the curing temperature can be higher than 400° C.

In the embodiment, referring to FIG. 2, it shows a thermal expansion of the polyimide by the method for manufacturing the polyimide according to the present disclosure. It can be seen that a thermal expansion coefficient (50° C.-300° C.) is 1.965 ppm/K, and a thermal expansion coefficient (50° C.-400° C.) is 4.107 ppm/K. Because of the introduction of hydrogen bonds and a good regular molecular chain arrangement, the thermal expansion coefficient of the polyimide is greatly reduced, and compared with ordinary polyimide material whose thermal expansion coefficient is 12-15 ppm/K, the polyimide of the embodiment has certain advantages.

In the embodiment, referring to FIG. 3, it shows a thermal weight loss of the polyimide prepared by the method for manufacturing the polyimide according to the present disclosure. It can be seen that a temperature of one percent weight loss rate of the polyimide is as high as 588.2° C., and the temperature is higher than a temperature of most of polyimide materials in the prior art. Mainly due to the introduction of regular molecular chains, wherein the regular molecular chains have highly oriented in-plane crystallization and low free volume; a simple rigid planar structure; and intramolecular hydrogen bonds (benzoylanilide), this results in the polyimide with high barrier properties, excellent heat resistance, and low coefficient of thermal expansion.

In the embodiment, when a thickness of a polyimide film is 10 microns, the polyimide prepared by the method for manufacturing the polyimide has an oxygen transmission rate (OTR) of 8.2±0.3 $(cm^3 \cdot m^{-2} \cdot day^{-1})$ and a water vapor transmission rate (WVTR) of 5.2±0.3 $(g \cdot M^{-2} \cdot day^{-1})$. When a thickness of a polyethylene terephthalate film is 10 microns, the polyethylene terephthalate has an oxygen transmission rate (OTR) of 56 $(cm^3 \cdot m^{-2} \cdot day^{-1})$ and a water vapor transmission rate (WVTR) of 22 $(g \cdot m^{-2} \cdot day^{-1})$. When a thickness of a polyethylene naphthalate film is 10 microns, the polyethylene naphthalate has an oxygen transmission rate (OTR) of 22 $(cm^3 \cdot m^{-2} \cdot day^{-1})$ at a thickness of 10 microns, and water vapor transmission rate (WVTR) is 6.8 $(g \cdot m^{-2} \cdot day^{-1})$. The polyimide prepared by the manufacturing method of the polyimide has good barrier properties and has a good effect on the encapsulation material. The polyimide prepared by the method for manufacturing the polyimide has good barrier properties, and the polyimide has a good effect when applied to encapsulated materials.

The present disclosure introduces a regular molecular chain arrangement, wherein the regular molecular chain arrangement has highly oriented in-plane crystallization and low free volume; a simple rigid planar structure; and intramolecular hydrogen bonds to prepare the polyimide that has high barrier performance, excellent heat resistance, and low thermal expansion coefficient.

An embodiment of the present disclosure provides a polyimide, and the polyimide is prepared by the method in any of the above embodiments.

Structures of the polyimide include:

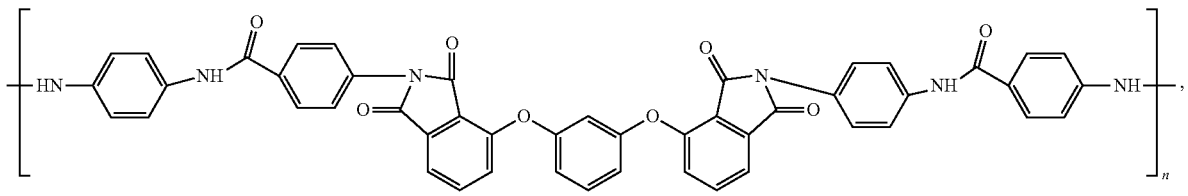

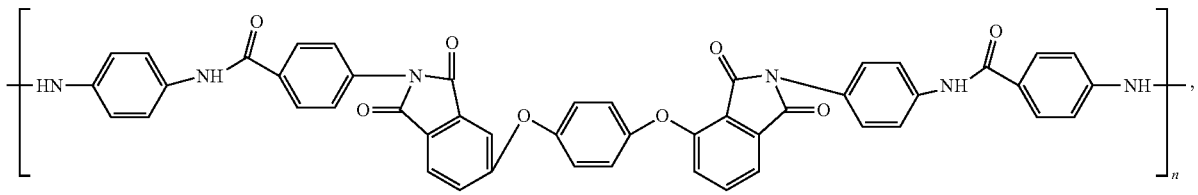

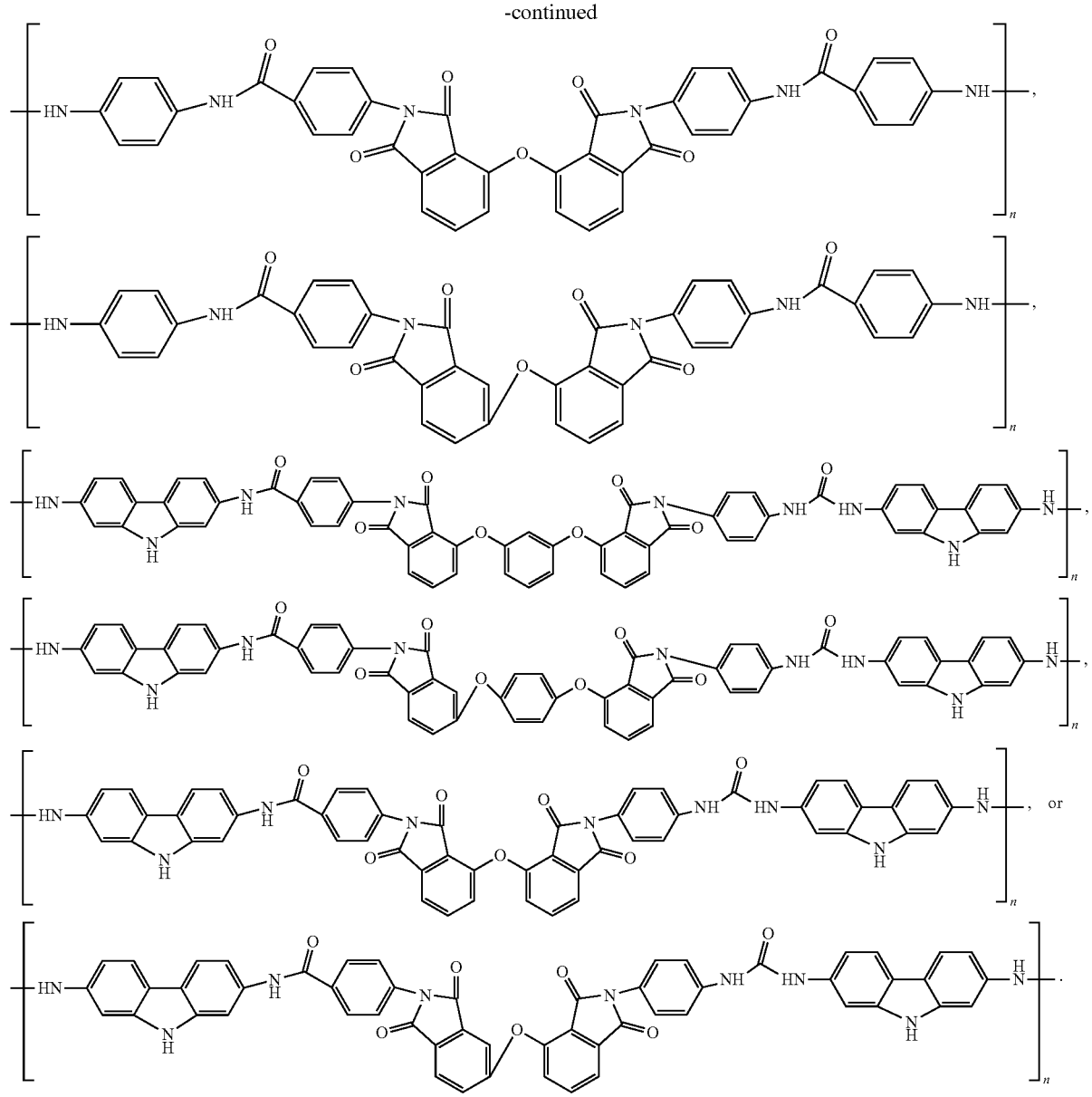

In the embodiment, referring to FIG. 2 which shows a thermal expansion of the polyimide, it can be seen that a thermal expansion coefficient (50° C.-300° C.) is 1.965 ppm/K, and a thermal expansion coefficient (50° C.-400° C.) is 4.107 ppm/K. Because of the introduction of hydrogen bonds and a good regular molecular chain arrangement, the thermal expansion coefficient of the polyimide is greatly reduced, and compared with ordinary polyimide material whose thermal expansion coefficient is 12-15 ppm/K, the polyimide of the embodiment has certain advantages.

In the embodiment, referring to FIG. 3 which shows a thermal weight loss of the polyimide, it can be seen that a temperature of one percent weight loss rate of the polyimide is as high as 588.2° C., and the temperature is higher than a temperature of most of polyimide materials in the prior art. Mainly due to the introduction of regular molecular chains, wherein the regular molecular chains have highly oriented in-plane crystallization and low free volume; a simple rigid planar structure; and intramolecular hydrogen bonds (benzoylanilide), this results in the polyimide with high barrier properties, excellent heat resistance and low coefficient of thermal expansion.

In the embodiment, when a thickness of a polyimide film is 10 microns, the polyimide prepared by the method for manufacturing the polyimide has an oxygen transmission rate (OTR) of 8.2±0.3 ($cm^3·m^{-2}·day^{-1}$) and a water vapor transmission rate (WVTR) of 5.2±0.3 ($g·M^{-2}·day^{-1}$). When a thickness of a polyethylene terephthalate film is 10 microns, the polyethylene terephthalate has an oxygen transmission rate (OTR) of 56 ($cm^3·m^{-2}·day^{-1}$) and a water vapor transmission rate (WVTR) of 22 ($g·m^{-2}·day^{-1}$). When a thickness of a polyethylene naphthalate film is 10 microns, the polyethylene naphthalate has an oxygen transmission rate (OTR) of 22 ($cm^3·m^{-2}·day^{-1}$) at a thickness of 10 microns, and water vapor transmission rate (WVTR) is 6.8 ($g·m^{-2}·day^{-1}$). The polyimide prepared by the manufacturing method of the polyimide has good barrier properties and has a good effect on the encapsulation material. The polyimide prepared by the method for manufacturing the polyimide has good barrier properties, and the polyimide has a good effect when applied to encapsulated materials.

The embodiment introduces a regular molecular chain arrangement, wherein the regular molecular chain arrangement has highly oriented in-plane crystallization and low free volume; a simple rigid planar structure; and intramolecular hydrogen bonds to prepare the polyimide that has high barrier performance, excellent heat resistance, and low thermal expansion coefficient.

In summary, the present disclosure provides a polyimide and a method for manufacturing the polyimide, the method for manufacturing the polyimide includes: defining a first substance by using a diamine compound including an amide bond; mixing a second substance with a first organic solvent and the first substance to prepare a third substance, wherein a molecular structure of the second substance includes an ether dianhydride; and processing the third substance by a cross-linking and curing process to form the polyimide. The present disclosure introduces a regular molecular chain arrangement, wherein the regular molecular chain arrangement has highly oriented in-plane crystallization and low free volume; a simple rigid planar structure; and intramolecular hydrogen bonds to prepare a polyimide that has high barrier performance, excellent heat resistance, and low thermal expansion coefficient.

It can be understood that for those of ordinary skill in the art, equivalent replacements or changes can be made according to technical solutions and inventive concepts of the present disclosure, and all such changes or replacements should be encompassed within the protection scope of the present disclosure.

What is claimed is:

1. A method for manufacturing a polyimide, comprising:
    defining a first substance by using a diamine compound comprising an amide bond;
    mixing a second substance with a first organic solvent and the first substance to prepare a third substance, wherein a molecular structure of the second substance comprises an ether dianhydride; and
    processing the third substance by a cross-linking and curing process to form the polyimide;
    wherein a plurality of steps for manufacturing the first substance comprise:
    mixing a p-phenylenediamine or a 9H-carbazole-2,7-diamine with a second organic solvent to prepare a first mixture;
    mixing a 4-aminobenzoic acid with the first mixture to prepare a second mixture, wherein a molar ratio of the p-phenylenediamine or the 9H-carbazole-2,7-diamine to the 4-aminobenzoic acid is 1:1; and
    processing the second mixture by vacuum distillation and vacuum drying to prepare the first substance.

2. The method for manufacturing the polyimide in claim 1, wherein the second organic solvent comprises N, N-dimethylformamide, N-methyl pyrrolidone, and N, N-dimethylacetamide.

3. The method for manufacturing the polyimide in claim 1, wherein a mass of the second organic solvent is 1 time to 5 times a total mass of the p-phenylenediamine and the 4-aminobenzoic acid, or the mass of the second organic solvent is 1 time to 5 times a total mass of 9H-carbazole-2,7-diamine and 4-aminobenzoic acid.

4. The method for manufacturing the polyimide in claim 1, wherein the 4-aminobenzoic acid with the molar ratio of 1:1 to the p-phenylenediamine or the 9H-carbazole-2,7-diamine is added to the first mixture within a preset duration, and the preset duration ranges from 1 hour to 2 hours.

5. The method for manufacturing the polyimide in claim 1, wherein a preparation of the second mixture is processed by stirring with a stirring rate ranging from 100 rpm to 250 rpm, and a reaction time of the preparation ranges from 2 hours to 7 hours.

6. The method for manufacturing the polyimide in claim 1, wherein a plurality of steps for manufacturing the third substance comprise:
    mixing the second substance with the first organic solvent to prepare a third mixture, wherein the molecular structure of the second substance comprises the ether dianhydride;
    mixing another second substance with the third mixture to prepare a fourth mixture, wherein a molecular structure of the another second substance comprises an ether dianhydride, and a molar ratio of the another second substance and the first substance is 1:1; and
    performing a bubble removing process for the fourth mixture to prepare the third substance.

7. The method for manufacturing the polyimide in claim 6, wherein a preparation of the third mixture is processed by stirring with a stirring rate ranging from 100 rpm to 250 rpm.

8. The method for manufacturing the polyimide in claim 6, wherein a plurality of steps of the bubble removing process comprise:
    stopping stirring the fourth mixture and filtering the fourth mixture in vacuum to prepare a fifth mixture; and
    pumping the fifth mixture with a vacuum pump and allowing the fifth mixture to stand to form the third substance.

9. The method for manufacturing the polyimide in claim 8, wherein the fifth mixture is pumped with the vacuum pump for 0.8 hour to 1.2 hours and the fifth mixture is allowed to stand for 2 hours to 4 hours to prepare the third substance.

10. The method for manufacturing the polyimide in claim 6, wherein during a preparation of the fourth mixture, a stirring rate ranges from 300 rpm to 500 rpm, a reaction time ranges from 5 hours to 12 hours, and a reaction temperature ranges from 50° C. to 100° C.

11. The method for manufacturing the polyimide in claim 6, wherein the first organic solvent comprises N, N-dimethylformamide, N-methyl pyrrolidone, and N, N-dimethylacetamide.

12. The method for manufacturing the polyimide as claimed in claim 6, wherein a mass of the first organic solvent is 1 time to 5 times a mass of the second substance.

13. The method for manufacturing the polyimide in claim 1, wherein the cross-linking and curing process comprises:
    removing a solvent of the third substance by a spin coating and a high-temperature vacuum drying process, wherein the solvent has a first volume, and the first volume accounts for 65% to 75% of a volume of the third substance.

14. The method for manufacturing the polyimide in claim 13, wherein the solvent having been removed is the first organic solvent.

15. The method for manufacturing the polyimide in claim 13, wherein after the third substance is processed by the spin coating and the high-temperature vacuum drying process to prepare a sixth mixture, the cross-linking and curing process further comprises:
    maintaining the sixth mixture at a first temperature for 20 minutes to 40 minutes;

heating the sixth mixture from the first temperature to a second temperature and holding the second temperature for 50 minutes to 70 minutes; and cooling the sixth mixture from the second temperature to the first temperature;

wherein the first temperature ranges from 110° C. to 130° C., the second temperature ranges from 420° C. to 500° C., a duration time of a preset post-drying process ranges from 3 hours to 5 hours.

16. The method for manufacturing the polyimide in claim 15, wherein the sixth mixture is heated from the first temperature to the second temperature in a constant heating rate, and the constant heating rate ranges from 4° C./min to 10° C./min; and the sixth mixture is cooled from the second temperature to the first temperature in a constant cooling rate, and the constant cooling rate ranges from 4° C./min to 10° C./min.

17. The method for manufacturing the polyimide in claim 1, wherein the first substance comprises:

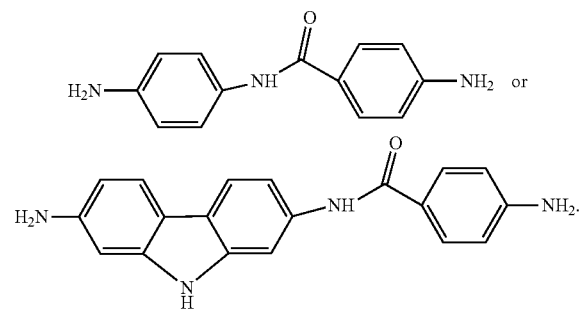

18. The method for manufacturing the polyimide in claim 1, wherein the second substance comprises:

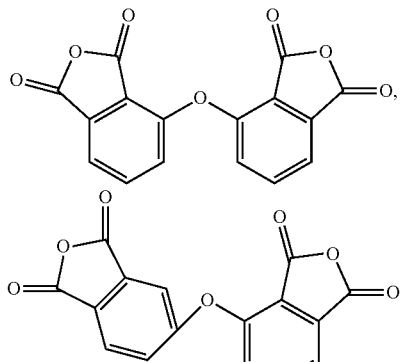

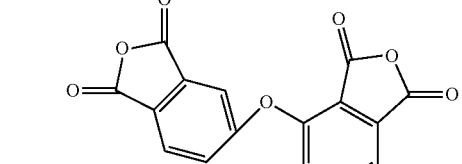

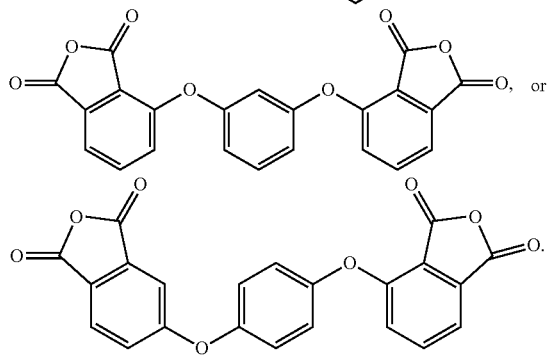

19. A polyimide, structures of the polyimide comprise:

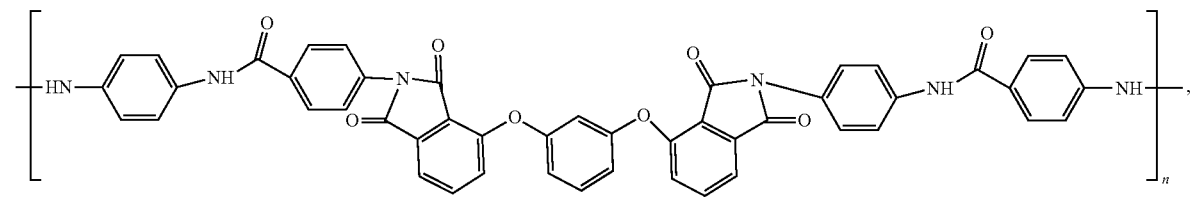

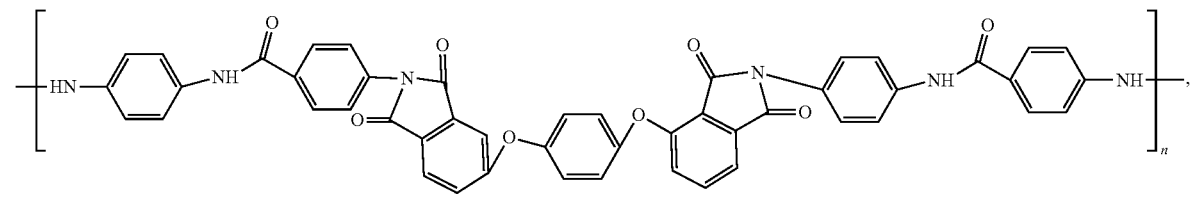

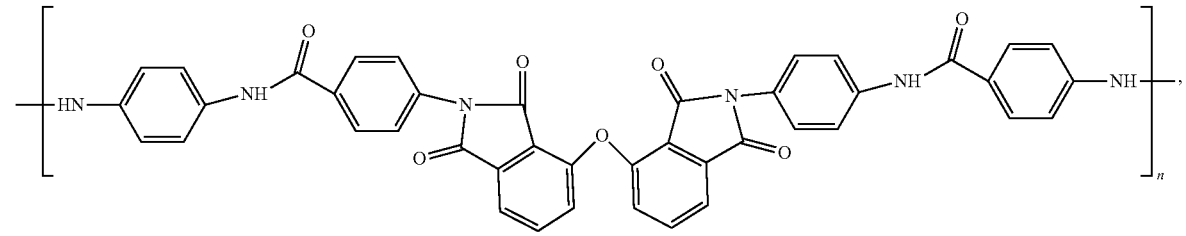

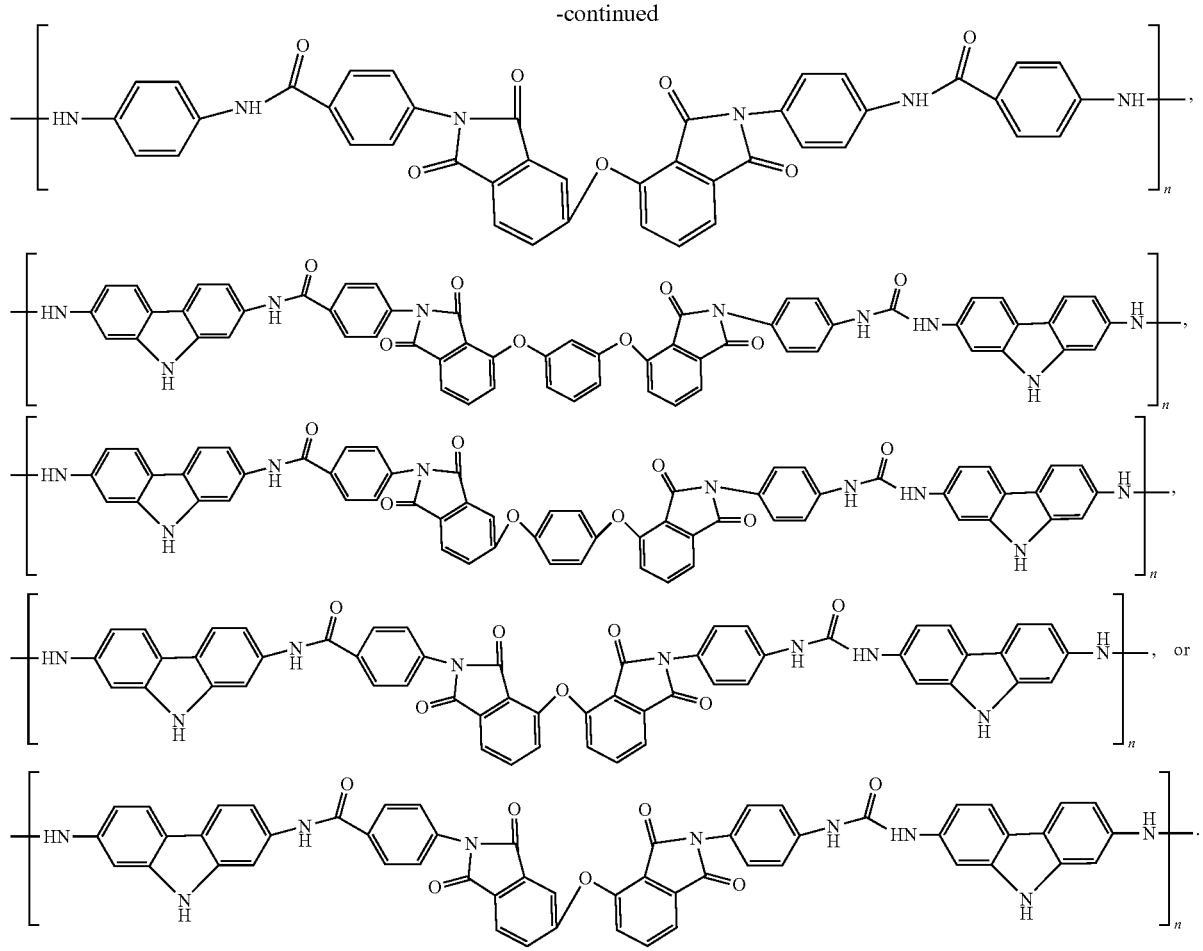
* * * * *